US006780362B1

(12) United States Patent
Story et al.

(10) Patent No.: US 6,780,362 B1
(45) Date of Patent: Aug. 24, 2004

(54) MODULAR MOLD AND DIE ASSEMBLY

(75) Inventors: Edward Ross Story, Fairfield, CT (US); Daniel John Heinz, Shelton, CT (US); Pasquale Michael Buzzeo, Westminster, MD (US); Gregory Alan Lathrop, Southbury, CT (US)

(73) Assignee: Unilever Home & Personal Care, USA division of Conopco, Inc., Greenwich, CT (US)

( * ) Notice: Subject to any disclaimer, the term of this patent is extended or adjusted under 35 U.S.C. 154(b) by 0 days.

(21) Appl. No.: 09/568,607

(22) Filed: May 10, 2000

(51) Int. Cl.[7] .......................... B29C 43/02; B29C 43/36; B29C 59/02; B29C 33/30
(52) U.S. Cl. ....................... 264/219; 264/320; 425/185; 425/344
(58) Field of Search ............................... 264/219, 320; 425/185, 344

(56) References Cited

U.S. PATENT DOCUMENTS

| 170,464 A | 11/1875 | Bakewell, Jr. ............... 249/170 |
| 1,677,929 A | * 7/1928 | Pippert |
| 1,816,915 A | * 8/1931 | Scott |

(List continued on next page.)

FOREIGN PATENT DOCUMENTS

| DE | 19748370 A1 | * 5/1999 | ........... C11D/17/00 |
| EP | 0 276 971 B1 | 7/1992 | |
| GB | 746 769 | 3/1956 | |
| JP | 59185560 | 10/1984 | |
| JP | 63118221 | 5/1988 | |
| JP | 08039616 | 2/1996 | |
| WO | 96/00278 A1 | 1/1996 | |
| WO | 96/35773 A1 | 11/1996 | |
| WO | 98/11194 A1 | 3/1998 | |
| WO | 99/23198 A1 | 5/1999 | |

OTHER PUBLICATIONS

International Search Report dated Oct. 3, 2001.

*Primary Examiner*—Michael Colaianni
*Assistant Examiner*—Michael I. Poe
(74) *Attorney, Agent, or Firm*—Alan A. Bornstein

(57) ABSTRACT

Modular die or mold assemblies comprise a platform, and at least one die or mold unit which is releaseably connected to the platform. The invention permits rapid changing of molds or dies, especially in the manufacture of detergent bars, such as soap bars. Surface ornamentation such as logos can be imparted to the detergent bars either directly from the stamping surface of the dies, from the stamping surface of the dies through an elastomeric lining, or from the surface of the elastomeric lining; in the latter case the indicia is imparted by a mold used to prepare the lining. The modular molds may be used where it is desired to coat the dies with elastomer, particularly where logos are imparted to the elastomeric layer, and where it may be desirable to change the logos, e.g., by changing the modular mold units.

2 Claims, 2 Drawing Sheets

U.S. PATENT DOCUMENTS

| | | | | |
|---|---|---|---|---|
| 3,103,705 A | * | 9/1963 | Letica | 249/68 |
| 3,127,457 A | | 3/1964 | DiPinto | 264/54 |
| 3,270,110 A | * | 8/1966 | Downie et al. | 264/219 |
| 3,380,121 A | | 4/1968 | Chittenden et al. | |
| 3,474,498 A | | 10/1969 | Hoppes | |
| 3,522,633 A | | 8/1970 | Cubitt | |
| 3,534,440 A | | 10/1970 | Roberts | |
| 3,539,144 A | | 11/1970 | Krug | 249/114 |
| 3,871,611 A | | 3/1975 | Taketa | 249/102 |
| 4,035,122 A | | 7/1977 | Cavanaugh | 425/84 |
| 4,076,207 A | | 2/1978 | Austin | 249/66 R |
| 4,202,522 A | * | 5/1980 | Hanas et al. | 249/102 |
| 4,384,702 A | * | 5/1983 | Boskovic | 249/103 |
| 4,757,972 A | | 7/1988 | Brown | 249/81 |
| 4,781,564 A | | 11/1988 | Cerrone | 425/289 |
| 4,793,959 A | | 12/1988 | Adams et al. | 264/320 |
| 4,809,945 A | | 3/1989 | Roussel | 249/136 |
| 4,822,273 A | | 4/1989 | Adams et al. | 425/385 |
| 4,959,002 A | * | 9/1990 | Pleasant | 425/192 R |
| 5,006,288 A | * | 4/1991 | Rhodes, Jr. et al. | 264/46.6 |
| 5,269,997 A | | 12/1993 | Leslie | 264/320 |
| 5,332,190 A | | 7/1994 | Watanbe et al. | 249/115 |
| 5,413,472 A | | 5/1995 | Dietterich et al. | 425/183 |
| 5,516,482 A | * | 5/1996 | Lupke | 264/508 |
| 5,731,014 A | | 3/1998 | Travaglini | 425/190 |
| 6,652,792 B1 | * | 11/2003 | Klein et al. | 264/219 |
| 6,676,872 B2 | * | 1/2004 | Story et al. | 264/219 |

* cited by examiner

US 6,780,362 B1

MODULAR MOLD AND DIE ASSEMBLY

FIELD OF THE INVENTION

The present invention relates to a modular die or mold and to a process for stamping or molding a plastic material using such die or mold to form a shaped article. In particular, it relates to a process for stamping a detergent bar and/or for molding an insert for a bar stamping die.

By "detergent bar" is meant a tablet, cake or bar in which the level of surface active agent, which comprises soap, synthetic detergent active or a mixture thereof, is at least 20 wt. % based on the bar.

BACKGROUND OF THE INVENTION

In the manufacture of detergent bars, a preformed composition comprising all components of the bar is typically extruded from a nozzle to form a continuous "rod" which is cut into smaller pieces of predetermined length, commonly referred to as "billets." These "billets" are then fed to a stamper or, alternatively, are given an imprint on one or more surfaces using, for example, a die of the same dimensions as the bar surface. The bar surface is hit with force by, e.g., a mallet or a die in the shape of a roller.

Stampers typically have a die formed in two halves each with a surface which contacts the billet during the stamping operation. These surfaces are adapted to close to a preset separation distance, thereby compressing the billet between the die halves to give the bar its final shape and appearance, and then separate. Excess composition is squeezed out from the die halves as they close. This is commonly referred to as "flash." The flash is then separated from the soap bar by transferring the bar through holes in a "deflashing plate."

Conventional die stamping machines include "pin die" shaped machines in which a pair of opposing die members or die halves meet during a compaction step, and a "box die" machine in which a pair of opposing die members stamp a bar held within a through-opening in a box frame but do not meet during compaction, the peripheral face of the bar being restrained by the box frame.

The die halves are often each provided with a die or ejector insert. These are normally held closed within the die halve by springs but can be pushed open by compressed air or mechanical means to assist in the release of the bar from the die. During closing of the die halves a vacuum can be applied to remove air trapped in the die cavity between the detergent bar and die surface and, in the case of rotary dies, this vacuum assists in retaining the bars in place during rotation.

Stamping of detergent bars using a die is carried out to give the bars a reproducible shape, smooth surface and/or to imprint a design such as a logo, trade mark or the like onto at least part of a surface of the bar.

However, as a result of die-blocking, i.e. amounts of residual detergent left on die halves which builds up during continued use of the dies, bars are often formed with visible imperfections on their surfaces or they may not release from the die surface. Numerous solutions to these problems have been proposed. One solution involves chilling the die halves during the stamping operation. Chiling uses valuable resources, particularly energy sources.

Another solution is described in GB-A-746 769 which discloses a die set which includes a die box and a pair of companion die members made of plastic materials comprising polymers with a specified modulus of elasticity. A disadvantage of this system is that a die release agent is necessary to prevent detergent from adhering to and building up on the dies and marring the surfaces of subsequently pressed bars.

WO 98/11194 is directed to a device for handling plastic materials such as a stamping device for stamping detergent bars, comprising at least two elastomeric coatings of different properties and/or compositions. Surface decorations such as uniform shape, smooth surface, design such as a logo, trademark or the like are said to be achievable in an easily reproducible manner in accordance with the invention. An advantage of thin elastomeric coatings is said to be that they can be easily applied in a factory to a conventional die with a built in logo. In describing the figure, it is said that a logo (not shown) may be formed on one or more of the die stamping surfaces if required.

Roberts, U.S. Pat. No. 3,534,440 discloses bodies of soap, detergent and the like which are pressed to final shape and/or size with indented or raised surface indicia in a die press. A detachable and replaceable section of embossed tape bearing the indicia is mounted on either an upper die pressing face or a bottom of a cavity or both. It is said that the invention may be used for synthetic detergent bars as well. Permanent indicia are said to restrict the dies to one usage run. Dies with replaceable inserts are said to be known. The thin embossable material embossed with the desired indicia may be attached by pressure sensitive adhesive means to one or more pressing faces of a pair of dies. It is said that while the tape seems relatively fragile, it does not rupture or deform under the high soap forming pressures and it is said to be believed that the air trapped in spaces opposite the embossed characters cooperates with inherent resiliency of the strip material effectively to uniformly cushion the strip to prevent destructive localized stress regions.

Cubbitt, U.S. Pat. No. 3,522,633 is directed to a die member comprising a rigid metal body having a forming surface provided with a panel receiving recess wherein a plastic design-bearing panel is molded in place. The panel has a surface that is substantially continuous with the die forming surface except for interruption by the design to be imparted to the article formed by the die. The panel is removable and replaceable by a different mold in place panel bearing a different design. The dies are for pressing of soap or like relatively soft material in bar cakes or any desired compact form.

An object of the Cubbitt invention is said to be to provide a novel soap pressing die structure wherein part of the internal soap contacting and forming surface of the die is a specially formed plastic panel for providing a desired design on the pressed soap bars. A further object of the invention is said to be a novel method of making a soap die member having a soap contacting and forming surface wherein an insert panel or the like is formed as by molding or casting into a recessed inset surface, the panel having an exposed surface which except for a design is essentially a continuation of the die pressing surface wherein the incorporated panel is removable for molding or casting a substitute panel. Should a different design be desired, panel 23 is displaced and replaced with another panel that is identical except for surface design. The replaceable panel may be formed in place on the metal die member using a master blank of hard non-deformable plastic. Preferably the panel material is a thermosetting material although it is said that thermoplastic material may also be used.

Pinto, U.S. Pat. No. 3,127,457 discloses a fluorocarbon film used as a release agent for molding polyurethane articles.

Krugg, U.S. Pat. No. 3,539,144 discloses a mold useful for producing polyurethane foams, which includes a structural mold shape and a coating of hot vulcanized silicon rubber disposed on the structural mold as well as a cold vulcanized silicone rubber deposited on the hot vulcanized silicon rubber.

Cavanugh, U.S. Pat. No. 4,035,122 discloses a soap saving device for compressing remnants of soap bars.

Austin, U.S. Pat. No. 4,076,207 discloses a food mold comprising a liner and a rigid holder wherein the liner has a rim for securement to the holder.

Roussel, U.S. Pat. No. 4,809,945 discloses a mold cavity for use in molding articles such as soap bars.

Watanabe, U.S. Pat. No. 5,332,190 discloses an elastic molding die composed of an elastomer laminate film, the innermost layer of which does not contain fillers.

In U.S. Pat. No. 5,269,997 it is proposed to provide each of two dies of a soap mold with an elastomeric septum stretched across their surfaces. Such a system would be complex to use at the speed required for commercial manufacture and a thin covering would be prone to tearing and logo reproduction would be expected to be poor.

WO 96/00278 (Adams et al.) is directed to a device for stamping a detergent bar having at least one bar stamping surface provided with at least one elastomeric coating having a thickness of less than 200 microns. An advantage of the device according to the invention is said to be that the elastomeric coating, being thin, can easily be applied in a factory to a conventional die with a built in logo. In FIG. 1, one die half is provided with a logo 14 on the bar stamping surface of a rigid member. This is also coated with elastomeric coating. In FIG. 5, the die cavity includes an injector bearing a logo.

Another solution is proposed in EP 276 971 and U.S. Pat. Nos. 4,793,959 and 4,822,273, which involve the use of two die members, each comprising a non-elastomeric and an elastomeric part. The elastomeric part, which contacts the soap bar during the stamping process, comprises an elastomer coating of at least 200 microns and having a modulus of elasticity within a specified range.

The manufacture of thick coated dies is a complex and expensive process. Therefore, it is highly desirable to maximize the working life of such coatings.

Hoppes, U.S. Pat. No. 3,474,498 discloses an indicia forming device for attachment to an article-forming surface portion of a mold, as for imprinting 3-dimensional medallion designs, or other indicia, in articles formed in the mold, as by blow molding methods. A thin, flexible pad or plate of rubber like plastic material is provided with appropriate 3-dimensional design configurations on one side thereof.

The Hoppes plate is positioned and adhered to an article forming surface portion of the mold. An object is to provide an indicia forming device which is quickly and efficiently interchangeable with like indicia forming devices to avoid undue expense and delays in the production of the blow molded articles. The medallion plate is a small rectangular piece of thermoplastic of thermo resin sheet material and it may be firmly, but removably adhesively attached to the article forming wall surface of the mold path. When replacement or renewal of the medallion plate is required, it may be peeled, scraped or otherwise removed from the mold cavity surface. It is said that the invention permits the dealer indicia to be changed as often as desired with only brief interruptions in production of the blow-molded articles. It is said that the medallion plate material may be any natural or synthetic rubber like material capable of resisting blow molded temperatures such as polyacrylic rubber.

Cerone, U.S. Pat. No. 4,781,564 discloses an apparatus for reforming soap bars. A lower shaping form and an upper shaping form, which may be replaced by another form to define a differently shaped or highlighted press chamber, are disclosed. The components are preferably formed of a durable structural material such as a hardwood or a molded plastic.

Dietterich et al., U.S. Pat. No. 5,413,472 discloses a molding device including first and second mold inserts.

Chittenden et al., U.S. Pat. No. 3,380,121 discloses a mold with replacable inserts so that the exterior appearance of a container blown within a mold may be changed without changing the basic shape and capacity of the container. The mold is for blow molding thermoplastic containers. It is said to be standard practice in the mold making industry to use inserts and molds for embossing figures, letters or designs on the article to be produced. Within recesses are provided removable metal inserts defining the walls of mold cavity and forming a surface which an article being blown is expanded. Means are provided for securing the inserts within the mold recesses so that the inserts can be easily and readily replaced within and removed from the recesses. It is preferred that the inserts be made of a metal having good thermal conductivity with respect to iron. The inserts themselves may be made of many different materials. The mold sectional body is usually produced from steel.

WO 99/23198 discloses a soap mold for pressing or stamping soap bars. Soap molds are described as having at least one dished cavity to accommodate one-half of the soap bar. An elastomeric part of the soap mold comes in contact with the soap mass to enable the soap to be more readily released. The soap mold of the '198 invention is characterized in that it has a coating that is insertable into the cavity as a prefabricated detachable insert. The insert does not adhere to the mold, but can be removed from the mold substantially in one piece once it has become worn or damaged. The insert of the invention can usefully be provided with markings, for example the name of the soap. Usefully, the insert of the invention has at least one opening for an ejector pin which passes through the opening. The ejector pin ejects soap from the mold after pressing or stamping. Advantageously, the ejector is also coated. The ejector with the coating of the invention can also be formed as a plate or insert. Plastics which may be used to fabricate soap mold inserts can generally be elastomers or non-elastomers.

Bakewell, U.S. Pat. No. 170,464 discloses a jointed mold with an interchangeable plug for producing words, figures or designs upon the gross article.

SUMMARY OF THE INVENTION

The present invention is directed to a modular die or mold assembly comprising a platform, and at least one die or mold unit, wherein the said die or mold unit is releasably connected to the platform. Preferably, at lest two die or mold units, more preferably at least four die or mold units, are present per platform.

The assembly permits rapid charge of a mold or die, e.g., where it is desired to change the logo or other surface indicia on the article to be stamped or molded. Preferably the modular die or mold assembly is structured such that one of said platform and said die or mold unit includes a tongue and the other of said platform and die or mold unit includes a groove and the tongue and groove releasably connect the platform to the die or mold unit. More preferably, the die or mold unit includes the tongue and the platform includes the groove.

The present invention may be used as a die assembly to stamp detergent bars or it can be utilized for as a mold assembly for molding a detergent bar die elastomeric layer in which the molds are removable to allow rapid die logo changes. The invention is also directed to a process for its use of the die and/or assembly, especially for making soap/detergent bar dies.

The mold and die can be returned to the original design at no additional cost. A key benefit is the capability to rapidly redesign and/or customize soap bars at substantially lower cost.

The invention provides a low cost rapid system of changing soap bar logo designs. In the case of the molds, the modular mold unit of the assembly of the invention can be removed and replaced with alternatives of varying logo and surface designs. The elastomeric liners for the dies are then molded to provide new linings for the stamping surfaces.

The invention is also directed to multicavity dies in which entire cavities can be replaced to change surface indicia.

The invention reduces the time and cost currently required to deliver a bar logo change. Preferably, the invention allows bar logo flexibility at a fraction of the resource of the existing procedure.

The invention is also directed to the process of using the molds to make inserts for stamping soap/detergent bars of the invention and to the use of the dies to stamp soap/detergent bars.

An advantage to the use of modular dies and/or molds is that the surface ornamentation on the various cavities of a multiple cavity mold or die can be changed at will. For instance, it may be desirable to have different logos or other ornamentation on different detergent bars stamped at the same time. For instance, it may be desirable to provide various ornamentation for children's detergent bars, e.g., various comic characters. Thus, the characters or other ornamentation could be varied from time to time, cavity by cavity. Also, damaged die or mold cavities could be replaced individual, cavity by cavity as the need arises for particular cavities.

For a more complete understanding of the above and other features and advantages of the invention, reference should be made to the following detailed description of preferred embodiments and the accompanying drawings.

DETAILED DESCRIPTION OF THE INVENTION

Figure 1:
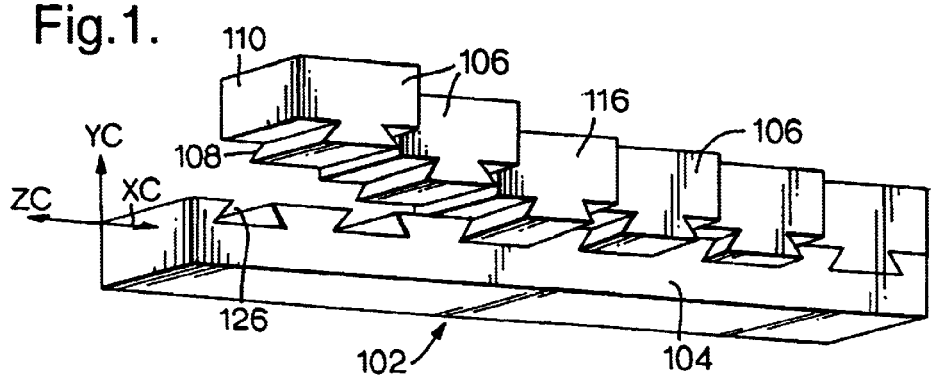
FIG. 1 is a perspective view from the side and below of a multicavity die or mold assembly of the invention shown. The dies are in varying positions with respect to the platform.
Figure 2:
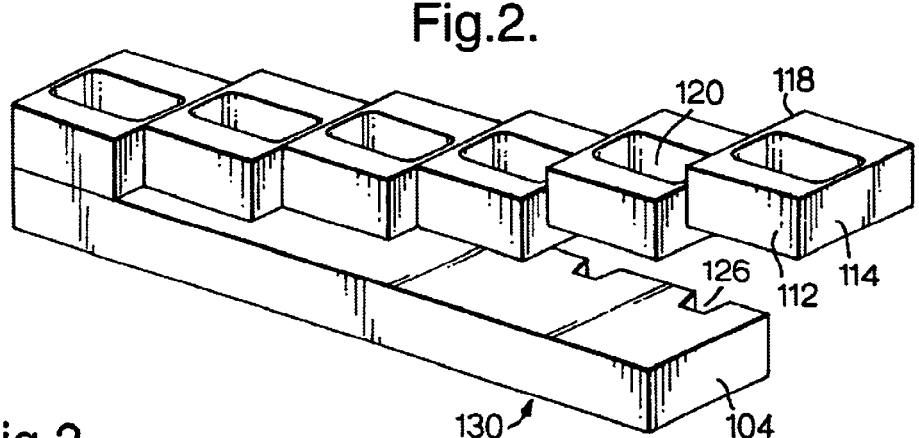
FIG. 2 is a perspective from above and the side of the assembly of FIG. 1.

The modular assemblies of the invention may be in the form of either dies or molds. In a particularly advantageous use, the modular assemblies of the invention are used in preparing detergent bars. In one embodiment, the modular assembly is a modular assembly of dies. In such case, the dies may be used directly to the stamp soaped bars. As seen in FIG. 1, die assembly 102 includes platform 104 and modular die units 106. Die units 106 each include a base 108 which forms a tongue. Above and attached to the base is bottom wall 110 from which arises first, second, third and fourth sidewalls, 112, 114, 116, and 118, respectively. Internally, the sidewalls define medial cavity 120. Platform 104 includes slots 126 which accommodate grooves 108. In assembly, the tongues 108 are slid into the grooves 126. One end 130 of each of the grooves 126 is closed so that the die units stop when they are slid to a point wherein the tongues 108 abut wall 130.

Figure 3:
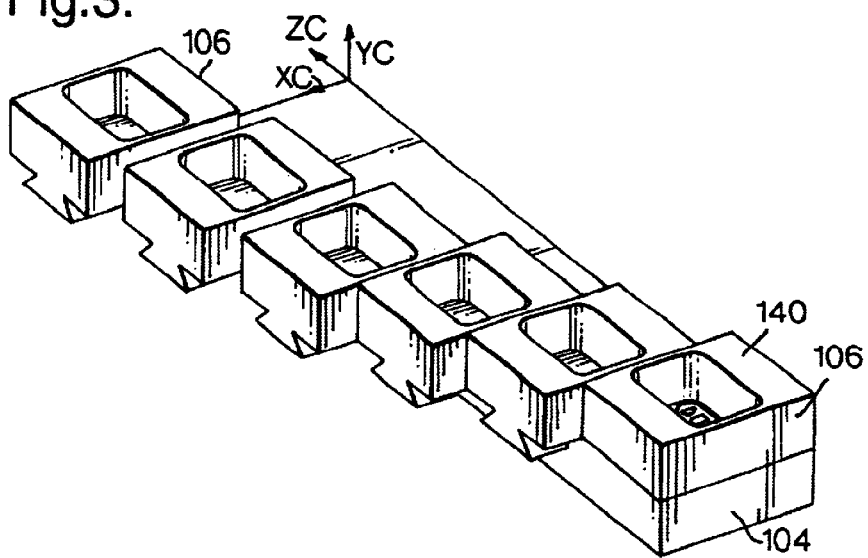
FIG. 3 is a perspective view from above on the other side.

As best seen in FIG. 3, the dies may be provided with an indicia 140 formed in the die cavity so that when the bar is stamped, the die indicia forms a bar indicia, such as a logo or the like, in the finished bar. In accordance with a particularly preferred aspect of the invention, when it is desired to change the logo, or if it is for any other reason necessary to change the die unit, the die unit 106 may be slid out and removed from association with platform 104 and replaced by a different unit. For instance, the different unit may include a different indicia forming surface.

If desired, the die may be coated with an elastomeric layer, to facilitate release of the bar after stamping. The coating may be formed in situ or the layer may first be formed on a mold and then adhered to the die surface as with chemical adhering compounds.

The use of thick elastomeric coatings in soap bar stamping is described in EP 276971 and U.S. Pat. Nos. 4,793,959 and 4,822,273, the disclosures of which are hereby incorporated by reference.

Hereinafter by "surface decoration" is meant a uniform shape, smooth surface, a design such as a logo, trademark or the like.

By "elastomeric" according to the invention is meant a material as defined in ISO (International Standard Organization) 1382 as an "elastomer," or a "rubber." Also included in the definition of "elastomeric" materials according to the invention are thermoplastic elastomers and copolymers and blends of elastomers, thermoplastic elastomers and rubbers.

Elastomers are defined as polymers with long flexible chains, independent in the raw material and transformed via vulcanizing or crosslinking agents which introduce crosslinks and form a crosslinked network structure. The network structure retains the movement of the macromolecular chain molecules and as a result returns rapidly to approximately its initial dimension and shape after deformation by a force and release of the force.

With increasing temperature an elastomer goes through a rubbery phase after softening and retains its elasticity and elastic modulus until its decomposition temperature is reached.

Thermoplastic elastomers comprise amorphous and crystalline phases. The amorphous phase has a softening range below ambient temperature and thus acts as an elastic spring while the crystalline segments whose softening range is above ambient temperature, act as crosslinking sites.

Preferably the elastomeric material according to the invention is selected from those classes described in American Society for Testing and Materials D1418 which include:

1. Unsaturated carbon chain elastomers (R class) including natural rubbers e.g. Standard Malaysian Rubber;

butadiene e.g. "BUNA" type ex Bunaweke Huls; and butadiene acrylonitrile copolymer e.g. "Perbunan" ex Bayer.

2. Saturated carbon chain elastomers (M Class) including ethylene-propylene types e.g. "Nordel" ex DuPont and fluorine-containing types e.g. "Viton" DuPont.
3. Substituted silicone elastomers (Q Class) including liquid silicone rubbers e.g. Silastic 9050/50 P (A+B) ex Dow Corning.
4. Elastomers containing carbon, nitrogen and oxygen in the polymer chain (U Class) including polyurethanes e.g. polyurethanes ex Belzona.

The "elastomeric" material, as hereinbefore defined, may be pretreated, such as by forming a solution of a commercially available elastomer, prior to it being placed in a mold. The elastomers, rubbers, and copolymers and blends thereof are generally cured or crosslinked, in-situ in the mold. For example, the components including the base elastomeric material, cross-linking agents and other materials such as accelerators may be mixed prior to application to the mold. Once applied to the mold the coatings are cured in-situ. This may be aided by the application of heat or other accelerating processes, for example pressure; radiation Or UV light.

The elastomeric material may be applied as either a liquid or a semi-solid. For instance, when applied as a liquid, the two halves of the die r mold are held apart at a predetermined spacing to permit the elastomer to occupy the space between the two parts. Preferably, the mold is filled with elastomer under pressure.

In some cases, materials may be dissolved with an appropriate solvent, applied to the die and the solvent subsequently driven off.

In the case of thermoplastic materials, they can be heated to melt condition applied to the mold, cooled and resolidified.

Materials suitable as elastomeric coatings in the present invention will preferably have a modulus of elasticity in the range 0.1 to 50 MPa, most preferably 1 to 35 MPa.

The modulus of elasticity of an elastomeric coating may be measured by recording the force required to indent the coating as a function of the indentation depth. Typically an indentor with a spherical tip may be employed and the slope, s, of the force as a function of the indentation depth to the power 3/2 is determined. The indentation depth is the movement of an indentor into the coating after it first contacts the surface of the coating. In general, it is necessary to correct the measured indentation depth for the compliance of the measurement apparatus. That is, the actual indentation depth, d, is related to the measured apparent value d' by the following expression $$d = d' - (F \cdot C)$$

where F is the indentation force. The compliance C is determined by compressing the indentor against a rigid surface and recording the apparent displacement as a function of the applied force which had a slope equal to C. The modulus of elasticity E is calculated from the following expression $$E = \tfrac{3}{4} s \, 1/(R)^{1/2} (1-b^2)$$

where $s = F/d^{3/2}$, R is the radius of the spherical tip of the indentor and b is the Poisson's ratio of the coating which is equal to about 0.5 for elastomers.

Under certain conditions to be described hereafter, the above indentation method may give falsely large values of the elastic modulus due to the influence of the rigid material onto which the coating is applied. In order safely to avoid this problem it is necessary to ensure that the contact radius of the indentor with the coating does not exceed about 1/10 of the thickness of the coating. The contact radius, a, is related to the indentation depth by the following expression $$a = (dR)^{1/2}$$

For coatings less than 200 $\mu$m, it is recommended that a nanoindentor is used which is capable of measuring indentation forces at small indentation depths using indentors with tips having a small radius. An example of such equipment is the "NanoIndenter II" (Nano-instruments). The alternative is to make thick (greater than 200 $\mu$m) test coatings so that more conventional measurement equipment such as an Instron tester, (e.g. Model 5566) may be employed.

Preferably the molds and the dies comprise a rigid material selected from metals and their alloys, for example brass and other copper alloys, aluminum, and steels including carbon and stainless steel; and other non-elastomeric materials such as thermosetting and thermoplastic resins, for example polyester, epoxy resins, furan resins; hard cast polyurethanes; ceramics; composites and laminates.

Additional materials, for example fillers, can be added to the elastomeric material to modify its mechanical and processing properties. The effects of filler addition depends on the mechanical and chemical interaction between the elastomeric material and the filler.

Fillers can be used to modify the elastomeric material such that desirable properties, for example tear resistance, are achieved. Suitable fillers include carbon blacks; silicas; silicates; and organic fillers such as styrene or phenolic resins.

Other optional additives include friction modifiers and antioxidants.

An edge or flange may extend from the die wall to cover the thickness of the cavity coating and preferably the thickness of the coating outside the cavity. The dimensions of the edge for optimal performance are therefore determined by the desired elastomeric layer thickness.

The thickness and hardness of the elastomeric coating can be varied according to the detergent bar composition, processing temperature and/or process parameters such as the shape of the cavity in the die halves, speed of the stamping equipment and separation distance of the die halves, in order to achieve the desired result, for example, good release of the detergent bar from the die. Similarly, for a bar composition which is inherently more difficult to stamp, acceptable die release may be achieved with a thicker elastomeric coating and/or one having a lower modulus of elasticity.

Elastomeric linings can be used to stamp a detergent bar comprising a surface active agent which comprises substantially soap or a synthetic detergent or a mixture of soap and synthetic detergent. It finds particular application in the stamping of soft and/or tacky detergent and/or mild bars which contain synthetic surfactants, translucent and transparent soap bars having a reduced fatty matter content, for example, in the range 63–78% wt. with respect to the total bar weight, and those bars containing skin beneficial agents such as humectants, polyols, oils, fatty acids and fatty alcohols.

It will be appreciated that many variations on the present invention may be utilized. For instance, either modular molds may be employed or modular dies may be employed, or both. Particularly where modular molds are not employed, the molds may have stamped directly on their detergent bar stamping surfaces the logo. An ejector may also be used, as is well known in the art. The modular die having the logo on its bar stamping surface may be used with or without an elastomeric lining. The modular molds of the invention may be used, e.g., to produce elastomeric linings. The elastomeric linings may or may not have logos or other surface orientation impressed on them by corresponding logos on the molding surfaces of the modular molds.

According to a further aspect of the invention there is provided a process for stamping a detergent bar comprising
i) forming from a modular mold according to the invention with a surface indicia an elastomeric coating layer having a surface decoration therein;
ii) inserting the layer on a die;
iii) feeding a detergent bar composition to the die of step ii;
iv) stamping the composition in the die to form a stamped bar; and
v) releasing the bar from the die such that a surface decoration is applied to the bar in an easily reproducible manner.

Preferably, the elastomeric layer is bonded to the die stamping surface by mechanical and/or chemical means to increase the adhesion between the die and the layer.

Figure 4:
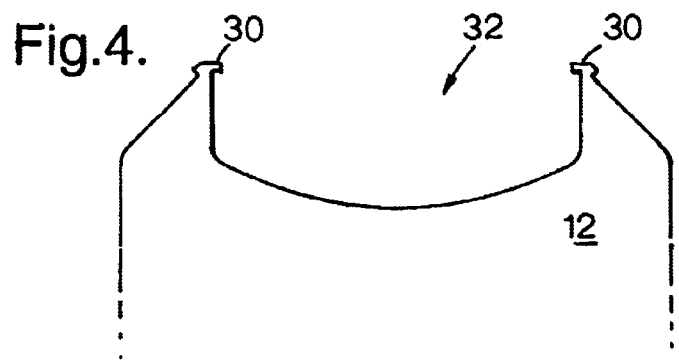
FIG. 4 is a cross-sectional side view of a die prior to the application of an elastomeric layer.
Figure 5:
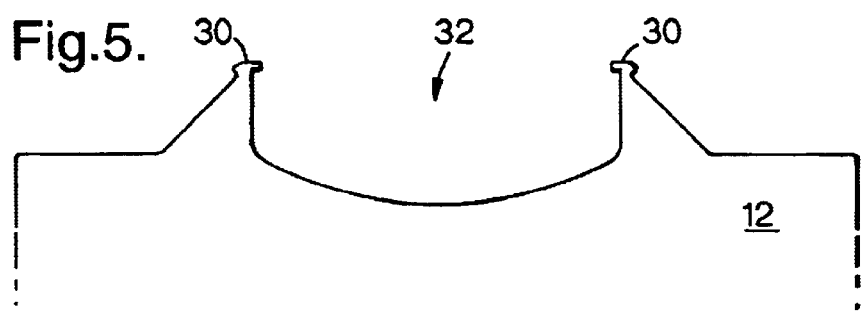
FIG. 5 is a cross-sectional front view of a die useful in the invention.
Figure 6:
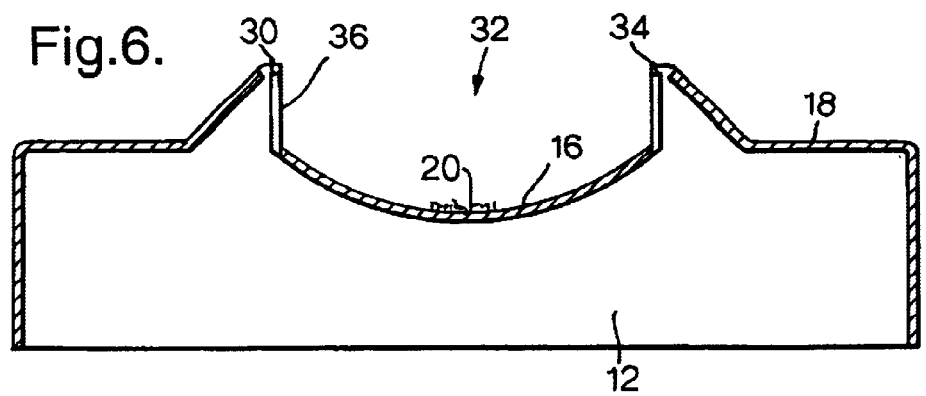
FIG. 6 is a cross-section of the die according to FIG. 3 wherein the die has been lined with an elastomeric layer.

FIGS. 4–6 show dies for use in embodiments wherein an elastomeric layer-lined die is to be employed. Dies 12 are provided with an elastomeric coating 16 (FIG. 6). Elastomeric coating is also provided on the non-stamping surface 18 of the die halves. One die half is provided with a logo 20 on the elastomeric layer. (In some cases both die halves will incorporate a logo).

Die 12 includes metal edge 30 which projects inwardly from the upper periphery of the detergent bar cavity 32. As seen in FIG. 6, edge 30 covers the upper edge of the generally vertically ascending section of the coating 16. Preferably, surface 34 of edge 30 which faces the cavity 32 is at least flush with the surface 36 of elastomer 16 which likewise faces cavity 32. Still more preferred is an arrangement wherein edge 34 of metal edge 30 extends slightly beyond the surface 36 of coating 16.

Using the edge or flange of the invention, the die is constructed so that the soft elastomer near the cutting edge is not damaged when the die cuts into the soap. This is accomplished by shielding the soft elastomer near the die edge with a rigid and stronger material. The shielding acts like an umbrella around the die edge slightly over lapping the soft elastomer preferably by approximately 0.001" to 0.015". This protects the soft material from excess forces in shear and tension which would accelerate damage to the soft material and render the die inoperative.

While the stress relieving edge of the die has been described as being metal, this will generally depend on the material from which the die is made. Typically, the edge will be same as the material from which the die is made. However the edge will typically be fairly rigid to protect the elastomer.

The invention may be used with conventional stamping equipment, such as Binacchi USN 100.

Figure 7:
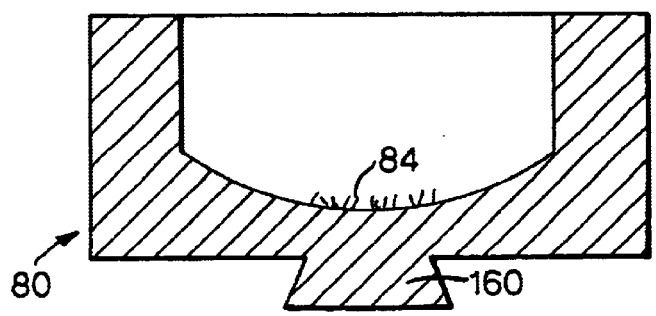
FIG. 7 is a perspective view of a mold unit according to the invention for preparing the elastomeric layer.

Elastomeric layer 16 is made using mold 80 (FIG. 7). Mold 80 may be a modular mold unit having tongue 160 as illustrated.

Mold 80 includes indicia 84. Mold 80 imparts to the elastomeric layer indicia formed by contact of indicia 84 with the forming elastomeric layer. Thus, elastomeric layer 16 includes indicia 20 which upon contact with the forming soap and/or detergent bar forms indicia in the soap/detergent bar.

When it is desired to change the logo, mold unit 80 is slid outwardly from a mold platform and a replacement mold unit with a new logo or other surface indicia is slid into the platform in its place. Stamping of a soap and/or detergent bar with a die lined with an elastomeric layer formed from the mold will bear the new logo or other surface decoration.

PROPHETIC EXAMPLE

A range of die halves are manufactured in carbon steel and spark eroded to a range of surface roughness values (Ra) degreased with acetone, treated with a primer and lined with a range of elastomeric materials having surface ornamentation impressed thereon made from modular molds in accordance with the invention. Other, non coated die halves are similarly prepared as modular dies in accordance with the invention having surface ornamentation present in their stamping surfaces.

A series of brass die halves are also used in the examples. Similarly, these are degreased with acetone, treated with a primer and then elastomeric layers are applied.

Elastomeric layers are formed from polyurethane in molds according to the invention. The polyurethane is prepared starting with
a) Andur 80-5AP—Polyether based liquid isocyanated-terminated prepolymer. Supplied by: Anderson Development Co. 1415 E Michigan Street Adrian, Mich. 49221-3499; and is cured using b) Voronal 234-630 curative—Triol
Supplied by: Dow Chemical Co 2040 Dow Center Midland, Mich. 48674

The bar compositions used in the examples are as follows:

|  | % wt. |
|---|---|
| Formulation A |  |
| Anhydrous tallow soap | 52.3 |
| Anhydrous coconut soap | 29.9 |
| Coconut fatty acid | 5.2 |
| Water and minors | to 100 |
| Formulation B |  |
| Sodium cocyl isethionate | 27.00 |
| Cocoamidopropyl betaine | 5.00 |
| Polyethylene glycol, M. Wt. | 33.12 |
| Fatty acid | 11.00 |
| Sodium stearate | 5.00 |
| Water + minors | to 100 |
| Formulation C |  |
| Sodium cocyl isethionate | 49.78 |
| 82/18 Soap | 8.31 |
| Sodium Stearate | 2.98 |
| Alkyl Benzene sulphonate | 2.02 |
| Stearic acid | 20.15 |
| Coco fatty acid | 3.08 |
| Sodium Isethionate | 4.68 |
| Water + minors | to 100 |

The dies contain metal edges as illustrated at 34 in FIG. 4.

It is found that the molds can be readily replaced with molds leaving different surface ornamentation to yield well-formed, but different surface ornamentation in the soap/detergent bars. Likewise, the modular die units can be readily replaced to yield well-formed, but different surface ornamentation.

It should be understood, of course, that the specific forms of the invention herein illustrated and described are intended to be representative only as certain changes may be made therein without departing from the clear teachings of the disclosure. Accordingly, reference should be made to the following appended claims in determining the full scope of the invention.

What is claimed is:

1. A process of stamping a detergent bar comprising stamping a billet with a modular die assembly comprising:
    (a) a platform; wherein the platform contains a plurality of tongues or defines a plurality of grooves; and
    (b) plurality of die or mold units attached to the platform, at least one of said units including an elastomeric liner connected to a base wherein the base defines a groove or contains a tongue so that the groove or tongue on the base connected to the at least one die or mold unit relasably engages and of the plurality of tongues or grooves of the platform.

2. A process of stamping a detergent bar comprising stamping said detergent bar with a die or mold unit lined with an elastomeric liner formed by molding said elastomeric liner with a modular mold assembly including:
    (a) a platform wherein the platform contains a plurality of tongues or defines a plurality of grooves; and
    (b) a plurality of die or mold units attached to the platform, at least one of said units connected to a base wherein the base defines a groove or contains a tongue so that the groove or tongue on the base connected to the at least one die or mold unit releasably engages and of the plurality of tongues or gooves of platform.

* * * * *

UNITED STATES PATENT AND TRADEMARK OFFICE
CERTIFICATE OF CORRECTION

PATENT NO. : 6,780,362 B1
DATED : August 24, 2004
INVENTOR(S) : Story et al.

It is certified that error appears in the above-identified patent and that said Letters Patent is hereby corrected as shown below:

Column 11,
Line 14, change "relasably" to -- releasably --
Line 14, change "and" to -- one --

Column 12,
Line 11, change "and" to -- one --

Signed and Sealed this

Fifteenth Day of February, 2005

JON W. DUDAS
*Director of the United States Patent and Trademark Office*